US012795393B2

(12) United States Patent
Gautam et al.

(10) Patent No.: US 12,795,393 B2
(45) Date of Patent: Nov. 10, 2026

(54) METHOD AND SYSTEM FOR COLLECTION OF MANAGEMENT DATA IN A 5G NETWORK

(71) Applicant: Samsung Electronics Co., Ltd., Suwon-si (KR)

(72) Inventors: Deepanshu Gautam, Bangalore (IN); Ashutosh Kaushik, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 556 days.

(21) Appl. No.: 17/862,888

(22) Filed: Jul. 12, 2022

(65) Prior Publication Data

US 2023/0024320 A1 Jan. 26, 2023

(30) Foreign Application Priority Data

Jul. 13, 2021 (IN) ............................. 202141031481
Jun. 10, 2022 (IN) ............................ 2021 41031481

(51) Int. Cl.
*H04W 24/10* (2009.01)
*H04W 24/02* (2009.01)
(Continued)

(52) U.S. Cl.
CPC ........... *H04W 24/02* (2013.01); *H04W 24/08* (2013.01)

(58) Field of Classification Search
None
See application file for complete search history.

(56) References Cited

U.S. PATENT DOCUMENTS

2021/0133670 A1* 5/2021 Cella ...................... G06N 20/10
2022/0045924 A1* 2/2022 Yao ..................... H04W 12/037
(Continued)

FOREIGN PATENT DOCUMENTS

CN 109818772 A * 5/2019 ......... H04L 41/5019
CN 113873544 A * 12/2021 ............ H04W 24/02
(Continued)

OTHER PUBLICATIONS

Nokia, "Rel-17 Input to DraftCR 28.622 Add, data collection job to allow consumers, without detailed knowledge of the network to request for data," TDoc S5-213199, 3GPP TSGSA WG5 Meeting #137-e; May 10-19, 2021.
(Continued)

*Primary Examiner* — Mohammed Rachedine
(74) *Attorney, Agent, or Firm* — Jefferson IP Law, LLP

(57) ABSTRACT

The disclosure relates to a 5G or 6G communication system for supporting a higher data transmission rate. A method and a system for collection of management data in a $5^{th}$ generation (5G) network is provided. A request from a Performance Assurance (PA) consumer is received for creating a management data collection job instance comprising one or more collection attributes. The management data is indicative of performance of the 5G network. A plurality of jobs is derived from the management data collection job instance and each of the plurality of jobs comprise one or more parameters relating to the one or more collection attributes of the management data collection job instance. The management data is generated by aggregating the values of each of the one or more parameters received from each of the plurality of jobs.

20 Claims, 6 Drawing Sheets

(51) Int. Cl.
*H04W 24/04* (2009.01)
*H04W 24/08* (2009.01)

(56) References Cited

U.S. PATENT DOCUMENTS

| | | | | |
|---|---|---|---|---|
| 2022/0086698 | A1* | 3/2022 | Yao | H04W 28/0268 |
| 2022/0174519 | A1* | 6/2022 | Chou | H04W 24/02 |
| 2022/0321435 | A1* | 10/2022 | Yao | H04W 24/08 |

FOREIGN PATENT DOCUMENTS

| | | | | |
|---|---|---|---|---|
| WO | 2017/222609 A1 | 12/2017 | | |
| WO | WO-2020252337 A1 * | 12/2020 | | H04W 24/10 |

OTHER PUBLICATIONS

Nokia, "Rel-17 Input to DraftCR 28.537 Add, requirements for producing and, reporting management data," 85-213210rev1; 3GPP TSG-SA5 Meeting #137-e, May 10, 2021-May 19, 2021.

Indian Office Action dated Mar. 9, 2023, issued in Indian Application No. 202141031481.

3GPP TS 28.550, "Technical Specification Group Services and System Aspects Management and orchestration; Performance assurance," Release 16, V16.9.0, Jun. 2022.

3GPP TS 28.532, "Technical Specification Group Services and System Aspects Management and orchestration; Generic management services," Release 16, V16.11.1, Jun. 2022.

Nokia, "Rel-17 Input to DraftCR 28.622 Add data collection job to allow consumers without detailed knowledge of the network to request for data," 3GPP TSGSA WG5 Meeting #137-e, S5-213199, May 10-19, 2021.

Nokia, "Rel-17 Input to DraftCR 28.537 Add requirements for producing and reporting management data," 3GPP TSG-SA5 Meeting #137-e, S5-213210, May 10-19, 2021.

3GPP TS 28.552, "Technical Specification Group Services and System Aspects; Management and orchestration; 5G performance measurements," Release 17, V17.3.1, Jun. 2021.

3GPP TS 28.622, "Technical Specification Group Services and System Aspects; Telecommunication management; Generic Network Resource Model (NRM) Integration Reference Point (IRP); Information Service (IS)," Release 16, V16.8.1, Jun. 2021.

International Search Report and written opinion dated Oct. 13, 2022, issued in International Application No. PCT/KR2022/010114.

* cited by examiner

METHOD AND SYSTEM FOR COLLECTION OF MANAGEMENT DATA IN A 5G NETWORK

CROSS-REFERENCE TO RELATED APPLICATION(S)

This application is based on and claims priority under 35 U.S.C. § 119(a) of an Indian Provisional patent application number 202141031481, filed on Jul. 13, 2021, in the Indian Patent Office, and of an Indian Complete patent application number 202141031481, filed on Jun. 10, 2022, in the Indian Patent Office, the disclosure of each of which is incorporated by reference herein in its entirety.

BACKGROUND

1. Field

The disclosure relates to a $5^{th}$ Generation (5G) telecommunication networks. More particularly, the disclosure relates to a method and system for collection of management data in a 5G network.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

A 5G telecommunication system typically consists of a 5G Access Network (AN), a 5G Core Network and a User Equipment (UE), as prescribed in the Third Generation Partnership Project (3GPP) Technical Specification TS 23.501. The 5G system is expected to be able to provide optimized support for a variety of different communication services, different traffic loads, and different end user communities. For example, the communication services using network slicing may include Vehicle to Everything (V2X) services, 5G seamless enhanced Mobile Broadband (eMBB), massive Internet of Things (mIoT) connections. The 5G system aims to enhance its capability to meet Key Performance Indicators (KPIs) that the emerging application and services require. For these advanced applications and services, the requirements such as data rate, reliability, latency, communication range and speed, are made more stringent.

The 5G seamless eMBB, is one of the key technologies to enable network slicing and is expected to provide native support for network slicing. For optimization and resource efficiency, the 5G system will select the most appropriate 3GPP or non-3GPP access technology for a communication service, potentially allowing multiple access technologies to be used simultaneously for one or more services active on the UE.

In massive IoT connections, support for mIoT brings many new requirements in addition to eMBB enhancements. Communication services with massive IoT connections such as smart households, smart grid, smart agriculture and smart meter will require the support of a large number and high-density IoT devices to be efficient and cost effective. Operators can use one or more network slice instances to provide these communication services, which require similar network characteristics, to different vertical industries. 3GPP TS 28.530 and 28.531 define the management of network slice in 5G networks. It also defines the concept of communication services, which are provided using one or multiple network slices. Generally, a Network Slice Instance (NSI) may support multiple Communication Service Instances (CSI). Similarly, a CSI may utilize multiple NSIs.

Further, performance assurance entails the capability of the management system to be able to provide required performance measurements to a consumer of the PA services. It also includes collecting measurements and computing KPIs for the purpose of network monitoring and management. Two alternatives have been defined for the PA in 3GPP System Aspects WG5 (SA5) working group. Firstly, a dedicated operation-based approach, where dedicated operation (e.g., createMeasurementJob) have been defined to request, receive and collect the required performance measurements. Secondly, a Network Resource Model (NRM) based approach where NRM control fragments (PerfMetricJob) are defined enabling the functionality of requesting, receiving and collecting the required performance measurements. In both these approaches, the consumer, in addition to other information, will have to identify the required performance measurements and the exposing entity in the network from which the measurement needs to be collected.

Furthermore, in the conventional techniques, the consumer should know the details of 3GPP NRM to request required performance measurements. Thus, in order to use the dedicated operation (PerfMetricJob or createMeasurementJob) to collect performance measurements and KPIs, the consumer need to know the exact name of the supported performance measurements and KPIs. Suppose, if the consumer wants to request for RM.RegisteredSubNbrMean.S-NSSAI, according to the conventional techniques, the consumer should be aware of the details of the NRM. Similarly, in order to get the required measurements and KPIs from a particular source, the consumer should be aware of the Data Network (DN) of the Access and Mobility Management function (AMFFunction) Meaning Oriented Interface (MOI) of the source. In another scenario, a consumer of the PA service can be outside the Operations Administration and Management (OAM) domain i.e., 5G Core or even external to the operator domains. In such scenarios, it will be very inconvenient and/or inefficient to know the details of the network. This requirement will prevent consumers from using standardized performance assurance mechanisms resulting in proprietary implementations. Also, this will further result in interoperability issue i.e., both the NRM and the performance assurance solutions need to come from the same vendor.

The above information is presented as background information only to assist with an understanding of the general background of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for collection of management data in a 5G network. The method may include receiving, by a Performance Assurance (PA) system, a request from a PA consumer for creating a management data collection job instance comprising one or more collection attributes. The management data may be indicative of performance of the 5G network. The method may include deriving a plurality of jobs from the management data collection job instance. Each of the plurality of jobs may include one or more parameters relating to the one or more collection attributes of the management data collection job instance. The method may include mapping the plurality of jobs with one or more network functions for collecting values of each of the one or more parameters. The method may include generating the management data by aggregating the values of each of the one or more parameters received from each of the plurality of jobs.

Another aspect of the disclosure is to provide a Performance Assurance (PA) system for collection of management data in a 5G network. The PA system may include a processor and a memory. The memory may be communicatively coupled to the processor and stores processor-executable instructions configured to, which on execution, cause the processor to receive a request from a PA consumer for creating a management data collection job instance comprising one or more collection attributes. The management data may be indicative of performance of the 5G network. The instructions may be configured to cause the processor to derive a plurality of jobs from the management data collection job instance. Each of the plurality of jobs may include one or more parameters relating to the one or more collection attributes of the management data collection job instance. The instructions may be configured to cause the processor to map the plurality of jobs with one or more network functions for collecting values of each of the one or more parameters. The instructions may be configured to cause the processor to generate the management data by aggregating the values of each of the one or more parameters received from each of the plurality of jobs.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
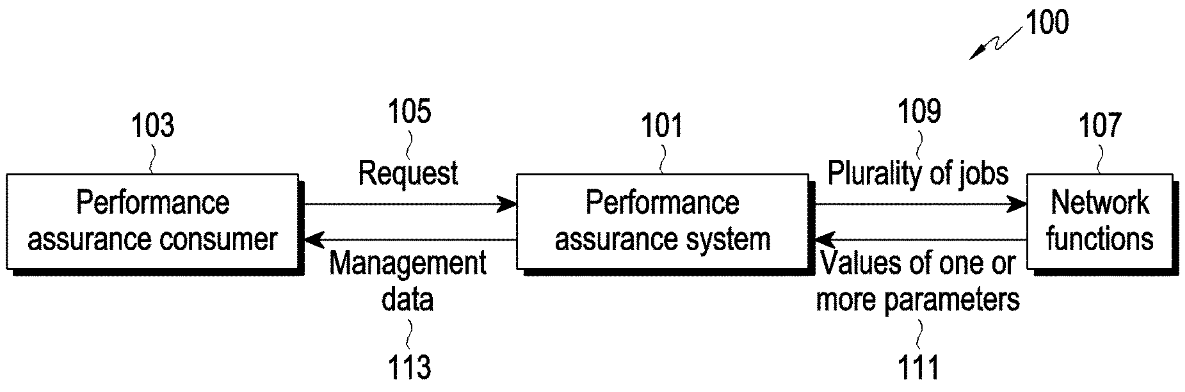
FIG. 1A shows an overview of functioning of a Performance Assurance (PA) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the word "exemplary" is used herein to mean "serving as an example, instance, or illustration." Any embodiment or implementation of the disclosure described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In an embodiment, the disclosure proposes a method and a Performance Assurance (PA) system for collection of management data in a 5G network. In an embodiment, the disclosure may receive a request from a Performance Assurance (PA) consumer for creating a management data collection job instance. The management data collection job instance may comprise one or more collection attributes. For example, the PA consumers may include, without limiting to, a Vehicle to everything (V2X) service, 5G seamless Enhanced Mobile Broadband (eMBB) service and a massive Internet of Things (mIoT) service and the like. The disclosure may derive a plurality of jobs from the management data collection job instance. Each of the plurality of jobs may include one or more parameters relate to parameters of the management data collection job instance. As an example, the plurality of jobs may include, without limiting to, a Performance Metric Job (PrefMetricJob), a Measurement Job (createMeasurementJob) and the like. The disclosure may include mapping the plurality of jobs with one or more network functions for collecting values of each of the one or more parameters. The one or more network functions may be configured to provide predefined services to one or more entities in the 5G network. The disclosure may include generating the management data by aggregating the values of each of the one or more parameters received from each of the plurality of jobs. The management data may be reported in at least one of a data streaming format and/or a data file format.

In an embodiment, the disclosure aims to provide a universal Object Class (IOC) to target the network functions from which the required measurements can be collected without identifying the exact object instance. Also, the disclosure enables the PA consumer to express the management data required in an abstract manner without exactly mentioning the parameters of the plurality of jobs.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the disclosure. The following description is, therefore, not to be taken in a limiting sense.

FIG. 1A shows an environment 100 including a Performance Assurance (PA) system 101 according to an embodiment of the disclosure.

In an embodiment, the PA system 101 may be a computing unit configured and used for collection of management data 113 in a 5G network. In an implementation, the PA system 101 may be deployed on a base station and/or any other network node associated with a PA consumer 103. In an embodiment, the PA system 101 may receive a request 105 from a PA consumer 103 for creating a management data collection job instance comprising one or more collection attributes. In an embodiment, the PA consumer 103 may be a Vehicle to everything (V2X) service node, a 5G seamless enhanced Mobile Broadband (eMBB) service node, a massive Internet of Things (mIoT) service node and the like. In an embodiment, the PA consumer 103 may request 105 for desired management data 113 without knowing the details of the exact object instance producing the management data 113.

In an embodiment, the management data collection job instance is an instance of ManagementDataCollectionJob Information Object Class (IOC). In an embodiment, one or more collection attributes of the management data collection job instance comprises at least one of a type of job, a target node filter, a collection time period, a reporting format, a network generation and a data scope. In an embodiment, the target node filter may comprise a plurality of filter parameters including at least one of a geographical location of the one or more nodes, a virtual resource utilization threshold, a network domain, a node vendor, a traffic type, a slice type and a service type.

In an embodiment, upon receiving the request 105, the PA system 101 may derive a plurality of jobs 109 from the management data collection job instance. In an embodiment, each of the plurality of jobs 109 comprise one or more parameters relating to the one or more collection attributes of the management data collection job instance. In an embodiment, a single management data collection job instance may be used to derive a plurality of jobs 109. As an example, the plurality of jobs 109 may include, without limiting to, a Performance Metric Job (PrefMetricJob), a Measurement Job (createMeasurementJob) and the like.

In an embodiment, subsequent to deriving the plurality of jobs 109, the PA system 101 may map the plurality of jobs 109 with one or more network functions 107 for collecting values of each of the one or more parameters 111. In an embodiment, the values of the one or more parameters 111 are collected from the one or more network functions 107 through a PA service producer associated with the one or more network functions 107. In an embodiment, the one or more network functions 107 are configured to provide predefined services to one or more entities in the 5G network. In an embodiment, after the values of each of the one or more parameters 111 are collected from the network functions 107, the values may be sent in at least one of a data streaming format and/or a data file format. In an embodiment, the management data 113 is transmitted in the data streaming format when the management data 113 is a continuous stream of data and the management data 113 is transmitted in the data file format when the management data 113 is a single instance data.

In an embodiment, upon collecting the values of each of the one or more parameters 111, the PA system 101 may generate the management data 113 by aggregating the values of each of the one or more parameters 111 received from each of the plurality of jobs 109. In one embodiment, if the attribute reporting format in the management data collection job instance was the data file, the PA consumer 103 may take the role of a data file reporting Managed Network Services (MnS) consumer and subscribe for 'notifyfileReady' notification, as defined in 3GPP TS 28.550 and in 3GPP TS 28.532 standards. Subsequently, the PA system 101 may send the 'notifyfileReady' notification to the PA consumer 103 when the file containing the required performance measurements is ready, as defined in 3GPP TS 28.550 and in 3GPP TS 28.532.

In an alternative embodiment, when the management data 113 is in a streaming format, the PA consumer 103 may take the role of a data streaming MnS consumer and establish a streaming connection with the PA server using 'establishStreamingConnection' operation, as defined in 3GPP TS 28.550 and in 3GPP TS 28.532 standards. In an embodiment, the PA system 101 may send the required management data 113 as stream using 'reportStreamData' operation as defined in 3GPP TS 28.550 standard. Finally, the PA consumers 103 receive the requested management data 113 in the requested format.

Figure 1B:
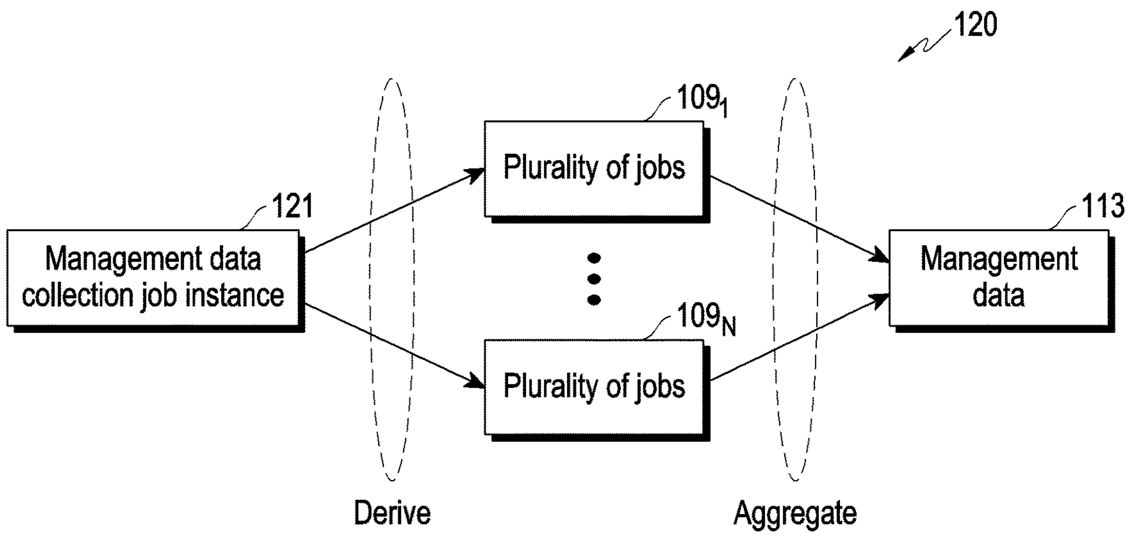
FIG. 1B shows an abstract illustration of functioning of a Performance Assurance (PA) system according to an embodiment of the disclosure.

FIG. 1B shows an abstract illustration of an environment 120 including a Performance Assurance (PA) system 101 according to an embodiment of the disclosure.

In an embodiment, the PA system 101 may derive a plurality of jobs 109 from a single management data collection job instance 121. In an embodiment, each of the plurality of jobs 109 comprise one or more parameters relating to the one or more collection attributes of the management data collection job instance 121. In an embodiment, the PA system 101 may map the plurality of jobs 109 with one or more network functions 107 for collecting values of each of the one or more parameters 111. In an embodiment, the PA system 101 may aggregate the management data 113 and sends the management data 113 to the PA consumer 103.

Figure 2:
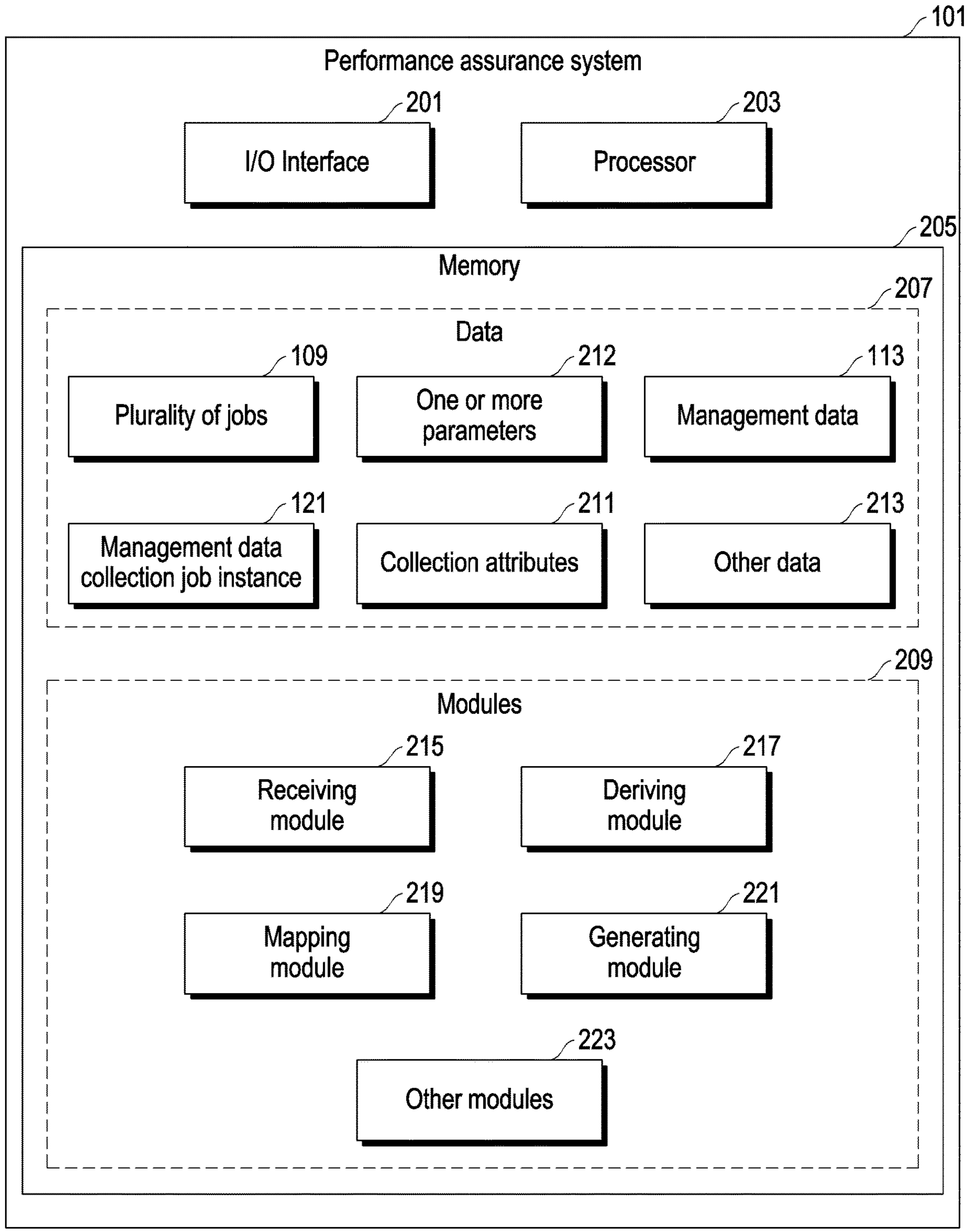
FIG. 2 shows a detailed block diagram of the Performance Assurance (PA) system according to an embodiment of the disclosure.

FIG. 2 shows a detailed block diagram of a Performance Assurance (PA) system 101 according to an embodiment of the disclosure.

In an embodiment, the PA system 101 may include an Input/Output (I/O) interface 201, a processor 203 and a memory 205. The processor 203 may be configured to perform one or more functions of the PA system 101 for collection of management data 113 in a 5G network, using the data 207 and the one or more modules 209 in stored in a memory 205 of the PA system 101. In an embodiment, the memory 205 may store data 207 and one or more modules 209.

In an embodiment, the data 207 may be stored in the memory 205 may include, without limitation, plurality of jobs 109, one or more parameters 212, a management data collection job instance 121, one or more collection attributes 211 and other data 213. In some implementations, the data 207 may be stored within the memory 205 in the form of various data structures. Additionally, the data 207 may be organized using data models, such as relational or hierarchical data models. The other data 213 may include various temporary data and files generated by the one or more modules 209.

In an embodiment, the plurality of jobs 109 are predefined jobs used to request 105 the management data 113 from the network functions 107. The plurality of jobs 109 may be derived from a management data collection job instance 121. Further, the plurality of jobs 109 may be mapped with one or more network functions 107 for collecting values of each of the one or more collection attributes 211 relating to performance measurements of the one or more network functions 107. In an embodiment, the ManagementDataCollectionJob instance may contain a JobType attribute. The JobType attribute may be mapped to exact measData (i.e., measurement data) in plurality of jobs 109. As an example, the plurality of jobs 109 may include, without limiting to, a Performance Metric Job (PrefMetricJob), a Measurement Job (createMeasurementJob) and the like.

In an embodiment, the one or more parameters 212 may be the parameters of the plurality of jobs 109. In other words, the one or more parameters 212 may relate to parameters of the management data collection job instance 121. Further, the values of one or more parameters 212 may be collected from the network functions 107. As an example, the one or more parameters 212 may be measurement category list (measurementCategoryList), performance metrics (performanceMetrics) and the like.

In an embodiment, the management data collection job instance 121 may be an instance of ManagementDataCollectionJob Information Object Class (IOC). The management data collection job instance 121 may be created based on a request 105 from a Performance Assurance (PA) consumer 103. The PA consumers 103 may specify one or more collection attributes 211 of the management data collection job instance 121.

In an embodiment, the one or more collection attributes 211 are attributes of the ManagementDataCollectionJob IOC. The one or more collection attributes 211 may comprise at least one of a type of job, a target node filter, a collection time period, a reporting format, a network generation and a data scope. Further, the attribute target node filter may comprise at least one of a geographical location of the one or more nodes, a virtual resource utilization threshold, a network domain, a node vendor, a traffic type, a slice type and a service type. Table 1 below defines the one or more collection attributes 211 with relevant definitions.

TABLE 1

| Attributes | Support | Cardinality | Description |
|---|---|---|---|
| 1. JobType | M | 1 . . . * | This attribute defines the type of management data requested by a Performance Assurance (PA) consumer.<br>Possible values of this attribute are: INTEGRITY, COVERAGE, ENERGY EFFICIENCY, VIRTUAL RESOURCE UTILIZATION, MOBILITY and ACCESSIBILITY |
| 2. TargetNodeFilter | M | 1 . . . * | An external PA consumer may not be able to mention the exact Network Function (NF) and/or target nodes. Therefore, a filter criteria helps the PA to narrow down and select an exact target node Identifier (ID) to take measurements from.<br>Target node filter is used to select a target node among the one or more nodes |
| 2a. geoLocation | M | 0 . . . * | The geographical location of the one or more nodes specifies a geographical location of a node from which the management data is to be collected.<br>The geographical location specifies a location from where the measurements shall be collected. This can be defined in terms of<br>A single Latitude and a Longitude referring to a centre or edge of the area polygon.<br>Geographical area |
| 2b. virtualResUtilization | M | 0 . . . * | Consumer may mention a % for virtual resource (virtual Random Access Memory (vRAM), Virtual Central Processing Unit (vCPU) and vDisk) utilization threshold as a criterion to target nodes for measurement reporting. This can be done in order to assist the resource deprived nodes. The management data will only be collected from the nodes whose average virtual resource consumption is crossing the defined threshold.<br>The virtual resource utilization threshold defines a threshold resource utilization percentage of the one or more nodes for collecting the management data. |
| 2c. networkDomain | M | 0 . . . * | A consumer might only specialize in analyzing and understanding a particular domain performance like Radio Access Network (RAN) or Core. In other words, a Number of Packets (NOP) may have more than |

TABLE 1-continued

| Attributes | Support | Cardinality | Description |
|---|---|---|---|
| | | | one consumer, different for different domains. In such scenario, it should be possible to indicate the network domain from where PA consumer wants measurements for its usage. The network domain parameter indicates the network domain of the one or more nodes Allowed values: Cognitive Network (CN) and/or RAN |
| 2d. provider | M | 0 . . . * | The PA consumer may want to have an understanding of a particular vendor's products for further actions. Each vendor has different quality in some functionalities for a network and this parameter can help in identifying one or more nodes quickly based on the provider. The node vendor parameter indicates name of the vendor of the one or more nodes. |
| 2e. trafficType | M | 0 . . . * | The 5G brings clear separation of user plane and control plane (CUPS) NFs in a network. A consumer may leverage it to identify target nodes to have measurements from. For example, the measurement report may be expected from the user plane nodes only. The traffic type parameter indicates a type of network traffic supported by the one or more nodes Allowed Values: Control Plane (CP) and/or User Plane (UP) |
| 2f. SliceType | 0 | 0 . . . * | The PA consumer may mention, as an input, a particular slice type (eMBB, URLLC, mIoT, V2X, HMTC), it may help in narrowing down the target NFs. With this, a producer shall more efficiently be able to identify the slice instance ID by narrowing down its criteria. The slice type parameter indicates a type of network slice to which the one or more nodes belong. Allowed values: eMBB, URLLC, mIoT, V2X, HMTC |
| 2g. ServiceType | M | 0, 1 | The service type parameter indicates a type of service provided by the one or more nodes, the type of service comprising at least one of data, voice, and video. As an example, if the PA consumer mentions 'voice' as the required service type, it means only those NFs need to be checked for measurements reporting which are involved in a 'voice service' to its customers. Allowed values: Data or Voice or Video |
| 3. collectionTimePeriod | M | 1 . . . * | The collection time period specifies a start time and an end time for collecting the management data from the one or more nodes. Exemplary format: Starting DD/MM/YY:HH:MM:SS to Ending DD/MM/YY:HH:MM:SS. This is the time period for which (like from X Time stamp to Y Time Stamp) the measurement of a type is required from a particular node. |
| 4. reportingFormat | M | 1 . . . * | The reporting format indicates at least one of a data streaming format or a data file format |
| 5. networkGen | M | 1 . . . * | It specifies the network generation of the target nodes. Allowed values: 4G or 5G or 6G |
| 6. dataScope | O | 0 . . . * | The data scope indicates a data standard for collecting the |

TABLE 1-continued

| Attributes | Support | Cardinality | Description |
|---|---|---|---|
| | | | management data, the data standard comprising at least one of a Single - Network Slice Selection Assistance Information (S-NSSAI) or 5G Quality of Service Identifier (5QI) |

In an embodiment, the data 207 may be processed by the one or more modules 209 of the PA system 101. In some implementations, the one or more modules 209 may be communicatively coupled to the processor 203 for performing one or more functions of the PA system 101. In an implementation, the one or more modules 209 may include, without limiting to, a receiving module 215, a deriving module 217, a mapping module 219, a generating module 221 and other modules 223.

As used herein, the term module may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, each of the one or more modules 209 may be configured as stand-alone hardware computing units. In an embodiment, the other modules 223 may be used to perform various miscellaneous functionalities of the PA system 101. It will be appreciated that such one or more modules 209 may be represented as a single module or a combination of different modules.

In an embodiment, the receiving module 215 may be configured for receiving a request 105 from a PA consumer 103 for creating a management data collection job instance 121. In an embodiment, the deriving module 217 may be configured for deriving a plurality of jobs 109 from the management data collection job instance 121. In an embodiment, the mapping module 219 may be configured for mapping the plurality of jobs 109 with one or more network functions 107 for collecting values of each of the one or more parameters 111. In an embodiment, the generating module 221 may be configured for generating the management data 113 by aggregating the values of each of the one or more parameters 111 received from each of the plurality of jobs 109.

Figure 3:
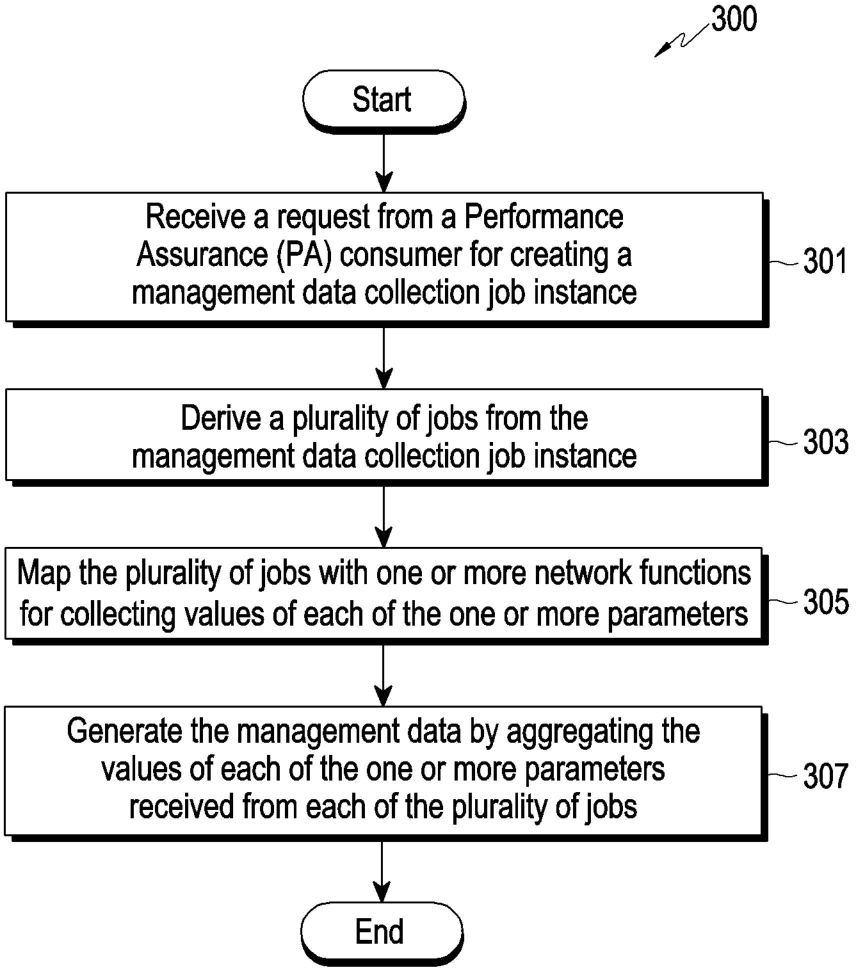
FIG. 3 shows a flowchart illustrating a method for collection of management data in a 5G network, according to an embodiment of the disclosure.

FIG. 3 shows a flowchart illustrating a method for collection of management data 113 in a 5G network, according to an embodiment of the disclosure.

Referring to FIG. 3, the method 300 may include one or more blocks illustrating a method for collection of management data 113 in a 5G network using a Performance Assurance (PA) system 101 illustrated in FIG. 2. The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the method 300 may include receiving, by the PA system 101, a request 105 from a PA consumer 103 for creating a management data collection job instance 121. The management data collection job instance 121 may comprise one or more collection attributes 211. The management data 113 may be indicative of performance of the 5G network. In an embodiment, the management data collection job instance 121 may be an instance of ManagementDataCollectionJob Information Object Class (IOC). In an embodiment, the one or more collection attributes 211 may comprise at least one of a type of job, a target node filter, a collection time period, a reporting format, a network generation and a data scope. In an embodiment, the type of job (JobType) may define a category of the management data 113 requested by the PA consumer 103. IN an embodiment, the one or more network functions may be identified by one or more nodes and the target node filter (TargetNodeFilter) is used to select a target node among the one or more nodes.

In an embodiment, the target node filter may comprise a plurality of filter parameters including at least one of a geographical location of the one or more nodes, a virtual resource utilization threshold, a network domain, a node vendor, a traffic type, a slice type and a service type. The geographical location (geolocation) of the one or more nodes may specify a geographical location of a node from which the management data 113 is to be collected. In an embodiment, the virtual resource utilization (virtualResUtilization) threshold may define a threshold resource utilization percentage of the one or more nodes for collecting the management data 113. In an embodiment, the network domain (networkDomain) parameter may indicate the network domain of the one or more nodes.

In an embodiment, the node vendor parameter may indicate name of the vendor (provider) of the one or more nodes. In an embodiment, the traffic type (trafficType) parameter may indicate a type of network traffic supported by the one or more nodes. In an embodiment, the slice type (SliceType) parameter may indicate a type of network slice to which the one or more nodes belong. In an embodiment, the service type (ServiceType) parameter may indicate a type of service provided by the one or more nodes, the type of service comprising at least one of data, voice, and video. In an embodiment, the collection time period (collectionTimePeriod) may specify a start time and an end time for collecting the management data 113 from the one or more nodes. In an embodiment, the reporting format (reportingFormat) indicates at least one of a data streaming format or a data file format. In an embodiment, the network generation (networkGen) may specify the generation of the one or more nodes. In an embodiment, the data scope (dataScope) may indicate a data standard for collecting the management data 113, the data standard comprising at least one of a Single-Network Slice Selection Assistance Information (S-NSSAI) or 5G Quality of Service Identifier (5QI).

At block 303, the method 300 may include deriving, by the PA system 101, a plurality of jobs 109 from the management data collection job instance 121. In an embodiment, each of the plurality of jobs 109 may comprise one or more parameters relating to the one or more collection attributes 211 of the management data collection job instance 121. As an example, the plurality of jobs 109 may include, without limiting to, a Performance Metric Job (PrefMetricJob), a Measurement Job (createMeasurementJob) and the like.

Further, as an example the attribute type of job (JobType) of ManagementDataCollectionJob IOC will result in the measurement category list (measurementCategoryList) and/or the performance metrics (performanceMetrics) for the Measurement Job (createMeasurementJob) and the Performance Metric Job (PrefMetricJob) respectively. The performance measurements may be as defined in Third Generation Partnership Project (3GPP) Technical Specification (TS) 28.552. The attribute target node filter (TargetNodeFilter) will result in Information Object Class instance list (iOCInstanceList) and/or object instances (objectInstances) for the Measurement Job (createMeasurementJob) and the Performance Metric Job (PrefMetricJob) respectively. The attribute reporting format (reportingFormat) will result in reporting method (reportingMethod) or reporting control (reportingCtrl) for the Measurement Job (createMeasurementJob) and the Performance Metric Job (PrefMetricJob) respectively.

At block 305, the method 300 may include mapping, by the PA system 101, the plurality of jobs 109 with one or more network functions 107 for collecting values of each of the one or more collection attributes 211 relating to performance measurements of the one or more network functions 107. In an embodiment, the values of the one or more parameters 111 may be collected from the one or more network functions 107 through a PA service producer associated with the one or more network functions 107. In an embodiment, the one or more network functions 107 may be configured to provide predefined services to one or more entities in the 5G network.

At block 307, the method 300 may include generating, by the PA system 101, the management data 113 by aggregating the values of each of the one or more parameters received from each of the plurality of jobs 109. In an embodiment, the management data 113 may be sent to the PA consumer 103 in at least one of a data streaming format and/or a data file format. The management data 113 may be transmitted in the data streaming format when the management data 113 is a continuous stream of data, and the management data 113 may be transmitted in the data file format when the management data 113 is a single instance data.

Figure 4A:
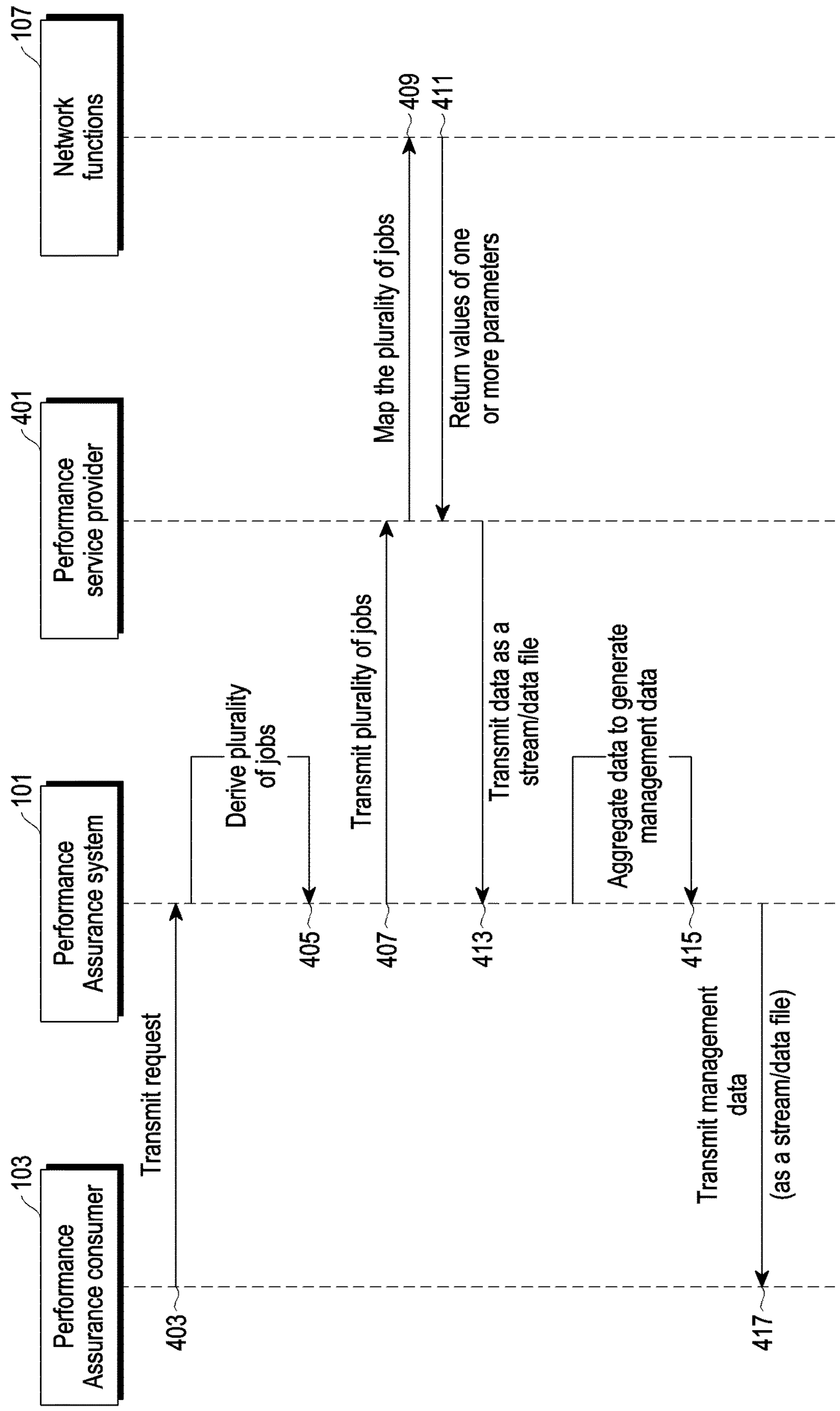
FIG. 4A shows a sequence diagram illustrating various operations involved in collection of management data in a 5G network, according to an embodiment of the disclosure.

FIG. 4A shows a sequence diagram illustrating operations for collection of management data 113 in a 5G network, according to an embodiment of the disclosure.

In an embodiment, at operation 403, a Performance Assurance (PA) consumer transmits a request 105 to create a management data collection job instance 121. The request 105 may be received by a PA system 101 and an instance of the ManagementDataCollectionJob Information Object Class (IOC) is created. In operation 405, the PA system 101 may derive a plurality of jobs 109 from a single management data collection job instance 121. In an embodiment, each of the plurality of jobs 109 may comprise one or more parameters relating to the one or more collection attributes 211 of the management data collection job instance 121.

In operation 407, the plurality of jobs 109 may be transmitted to a performance service provider 401, which maps the plurality of jobs 109 with the relevant one or more network functions 107, as indicated in operation 409. In an embodiment, the values of each of the one or more parameters 111 may be collected from the network functions 107 and the collected values are returned to the performance service provider 401 at operation 411. Further, in operation 413, the performance service provider 401 may transmit the values as a steam and/or a data file. Thereafter, at operation 415, the PA system 101 may aggregate the values of each of the one or more parameters 111 received from each of the plurality of jobs 109 into the management data 113 and transmits it to the PA consumer 103 at operation 417.

Figure 4B:
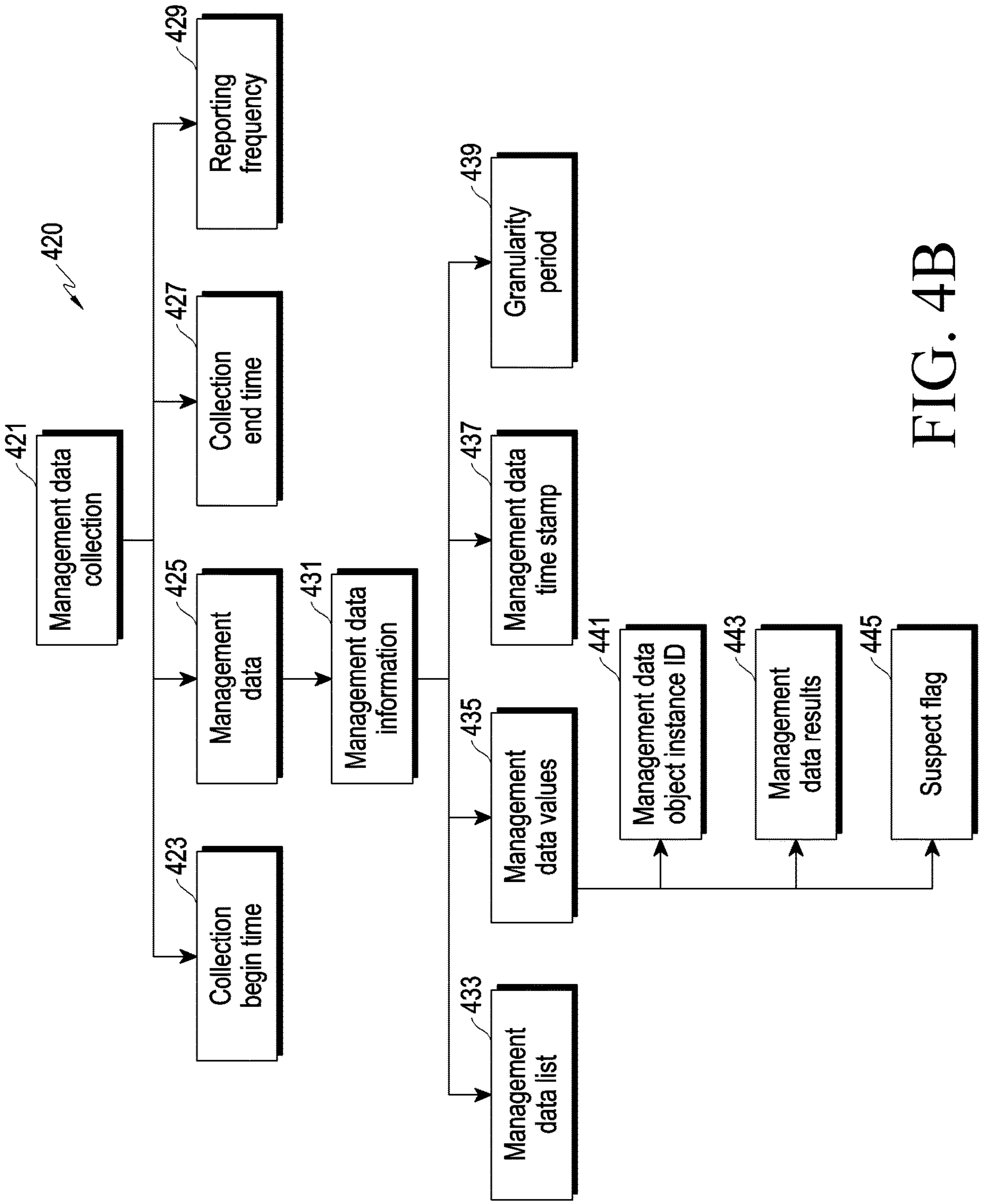
FIG. 4B shows a structure of the management data in a data file format, according to an embodiment of the disclosure.

FIG. 4B shows a structure 420 of the management data 113 in a data file format, according to an embodiment of the disclosure.

Referring to FIG. 4B, the Performance Assurance (PA) system may generate management data 113 by aggregating the values of each of the one or more parameters 111 received from each of the plurality of jobs 109. In an embodiment, if the PA consumer requests the management data 113 from the PA system 101 in a data file format, the PA system 101 may consolidate management data 113 in a single data file. Table 2 below shows an example of the data file content with relevant description.

TABLE 2

| File Content Item | Description |
|---|---|
| Management data collection 421 | This is a top-level tag, which identifies the file as a collection of management data. |
| >Collection begin time 423 | The "collectionBeginTime" is a time stamp that refers to the start of the first measurement collection interval (granularity period) that is covered by the collected management data results that are stored in the data file. |
| >Management data 425 | The "measData" construct represents the sequence of zero or more management data result items contained in the file. In other words, the "measData" is the real performance measurements as per Technical Specification (TS) 28.552, which are collected from the one or more selected network functions. |
| >Collection end time 427 | The "collectionEndTime" is a time stamp that refers to the end of the last management data collection interval (granularity period) that is covered by the collected management data results that are stored in this file |
| >Reporting frequency 429 | This defines the frequency of the report i.e., the frequency at which the notifFileReady will be sent to the subscribers for this file. |
| >>Management data information 431 | The sequence of management data, values and related information |
| >>>Management data list 433 | This is the list of management data for which the following, analogous list of management data values pertains. |
| >>>Management data values 435 | This parameter contains the list of measurement results for the resource being measured, e.g., gNB, AMF |

TABLE 2-continued

| File Content Item | Description |
|---|---|
| >>>Management data time stamp 437 | This tag carries the time stamp that refers to the time at which the management data is collected. |
| >>>Granularity period 439 | Granularity period of the management data in seconds |
| >>>>Management data object instance ID 441 | It contains the Local Distinguished Name (LDN) of the measured object. |
| >>>>Management data results 443 | This parameter contains the sequence of result values for the observed measurement types |
| >>>>Suspect flag 445 | Used as an indication of quality of the scanned data. 'FALSE' indicates a reliable data, 'TRUE' if not reliable. The default value is 'FALSE'. In case the suspect flag has its default value, it may be omitted. |

Computer System

Figure 5:
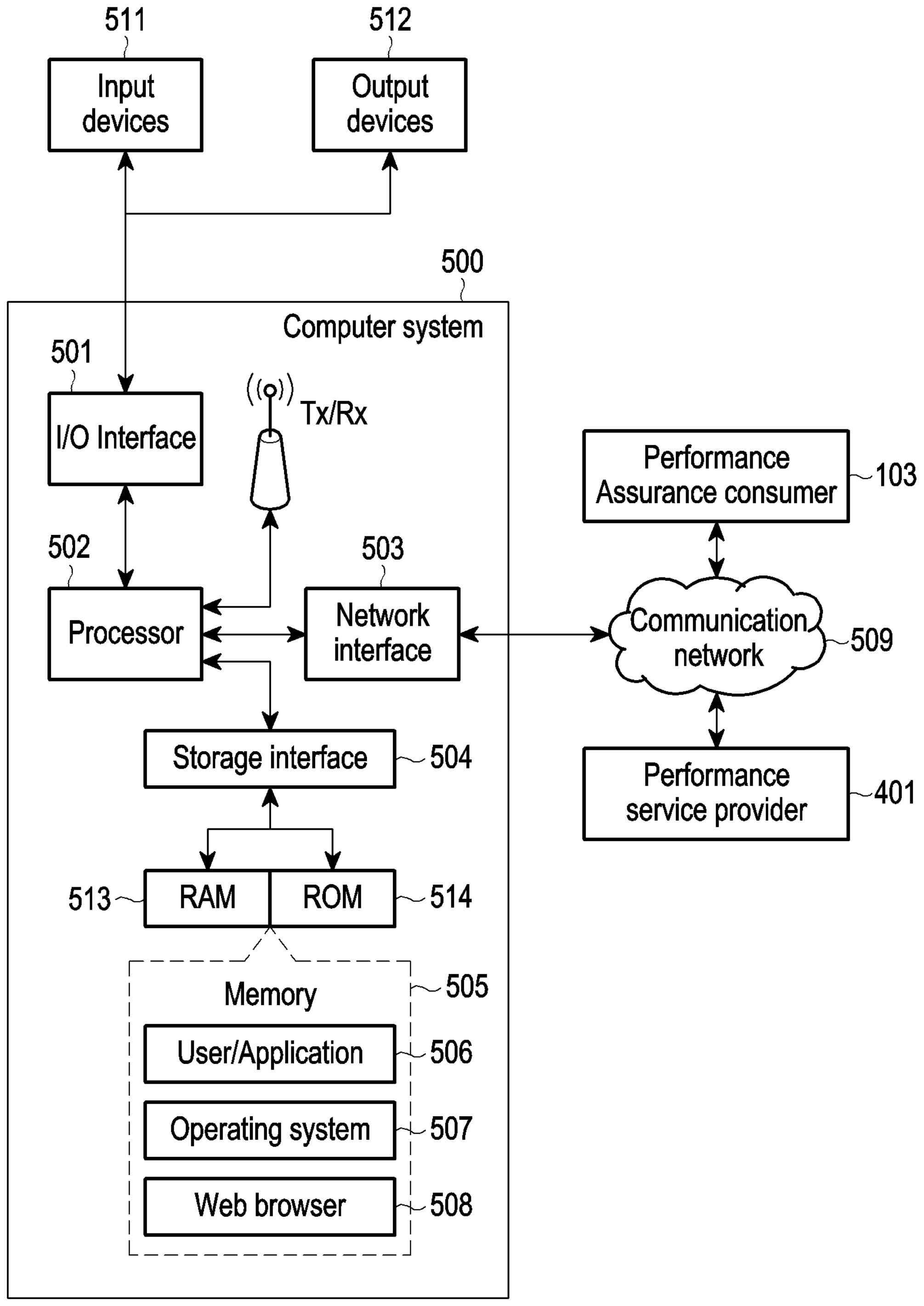
FIG. 5 illustrates a block diagram of a computer system for implementing embodiments consistent with according to an embodiment of the disclosure.

FIG. 5 illustrates a block diagram of a computer system 500 for implementing embodiments consistent with according to an embodiment of the disclosure.

In an embodiment, the computer system 500 may be the Performance Assurance (PA) system 101 illustrated in FIG. 2, which may be used for collection of management data 113 in a 5G network. The computer system 500 may include a central processing unit ("CPU" or "processor" or "memory controller") 502. The processor 502 may comprise at least one data processor for executing program components for executing user- or system-generated business processes. The processor 502 may include specialized processing units such as integrated system (bus) controllers, memory controllers/memory management control units, floating point units, graphics processing units, digital signal processing units, etc.

The processor 502 may be disposed in communication with one or more Input/Output (I/O) devices (511 and 512) via I/O interface 501. The I/O interface 501 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc.

In an implementation, the communication network 509 may be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP) etc., to communicate with each other. Further, the communication network 509 may include a variety of network devices, including routers, bridges, servers, computing devices, storage devices, etc. In an embodiment, the communication network 509 may be used for interfacing with a performance assurance consumer 103 and a performance service provider 401.

In some embodiments, the processor 502 may be disposed in communication with a memory 505 (e.g., Random Access Memory (RAM) 513, Read-Only Memory (ROM) 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application interface 506, an operating system 507, a web browser 508, and the like. In some embodiments, computer system 500 may store user/application data, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user/application interface 506 may facilitate display, execution, interaction, manipulation, or operation of program components through textual or graphical facilities. For example, the user/application interface 506 may provide computer interaction interface elements on a display system operatively connected to the computer system 500, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 508 may be a hypertext viewing application. Secure web browsing may be provided using Secure Hypertext Transport Protocol (HTTPS), Secure Sockets Layer (SSL), Transport Layer Security (TLS), and the like. The web browsers 508 may utilize facilities such as AJAX, DHTML, ADOBE® FLASH®, JAVASCRIPT®, JAVA®, Application Programming Interfaces (APIs), and the like. Further, the computer system 500 may implement a mail server stored program component. The mail server may utilize facilities such as ASP, ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

In an embodiment, the method is disclosed for collection of management data in a 5G network. The method may include receiving (301), by a Performance Assurance (PA) system, a request from a PA consumer for creating a management data collection job instance comprising one or more collection attributes, wherein the management data is indicative of performance of the 5G network. The method may include deriving (303), by the PA system, a plurality of jobs from the management data collection job instance, wherein each of the plurality of jobs comprise one or more parameters relating to the one or more collection attributes of the management data collection job instance. The method may include mapping (305), by the PA system, the plurality of jobs with one or more network functions for collecting values of each of the one or more parameters. The method may include generating (307), by the PA system, the management data by aggregating the values of each of the one or more parameters received from each of the plurality of jobs.

In an embodiment, the management data collection job instance may be an instance of ManagementDataCollectionJob Information Object Class (IOC).

In an embodiment, the one or more collection attributes may include at least one of a type of job, a target node filter, a collection time period, a reporting format, a network generation, or a data scope.

In an embodiment, the type of job may define a category of the management data requested by the PA consumer. In an embodiment, each of the one or more network functions may be identified by one or more nodes and the target node filter is used to select a target node among the one or more nodes. In an embodiment, the target node filter may include a plurality of filter parameters including at least one of a geographical location of the one or more nodes, a virtual resource utilization threshold, a network domain, a node vendor, a traffic type, a slice type, or a service type.

In an embodiment, the geographical location of the one or more nodes may specify a geographical location of a node from which the management data is to be collected. In an embodiment, the virtual resource utilization threshold may define a threshold resource utilization percentage of the one or more nodes for collecting the management data. In an embodiment, the network domain parameter may indicate the network domain of the one or more nodes. In an embodiment, the node vendor parameter may indicate name of the vendor of the one or more nodes. In an embodiment, the traffic type parameter may indicate a type of network traffic supported by the one or more nodes. In an embodiment, the slice type parameter may indicate a type of network slice to which the one or more nodes belong. In an embodiment, the service type parameter may indicate a type of service provided by the one or more nodes, the type of service comprising at least one of data, voice, and video.

In an embodiment, the collection time period may specify a start time and an end time for collecting the management data from the one or more nodes.

In an embodiment, the reporting format may indicate at least one of a data streaming format or a data file format.

In an embodiment, the management data may be transmitted in the data streaming format when the management data is a continuous stream of data. In an embodiment, the management data may be transmitted in the data file format when the management data is a single instance data.

In an embodiment, the data scope may indicate a data standard for collecting the management data, the data standard comprising at least one of a Single-Network Slice Selection Assistance Information (S-NSSAI) or 5G Quality of Service Identifier (5QI).

In an embodiment, the values of the one or more parameters may be collected from the one or more network functions through a PA service producer associated with the one or more network functions. In an embodiment, the one or more network functions may be configured to provide predefined services to one or more entities in the 5G network.

In an embodiment, a performance assurance (PA) system is disclosed for collecting management data in a 5G network. The PA system may include a processor 203, and a memory 205, communicatively coupled to the processor. In an embodiment, the memory may store processor-executable instructions configured to, which, on execution, causes the processor to receive a request from a PA consumer for creating a management data collection job instance comprising one or more collection attributes, wherein the management data is indicative of performance of the 5G network, derive a plurality of jobs from the management data collection job instance, wherein each of the plurality of jobs comprise one or more parameters relating to the one or more collection attributes of the management data collection job instance, map the plurality of jobs with one or more network functions for collecting values of each of the one or more parameters, and generate the management data by aggregating the values of each of the one or more parameters received from each of the plurality of jobs.

In an embodiment, the management data collection instance may be an instance of ManagementDataCollectionJob Information Object Class (IOC).

In an embodiment, the one or more collection attributes may include at least one of a type of job, a target node filter, a collection time period, a reporting format, a network generation and a data scope.

In an embodiment, the type of job may define a category of the management data requested by the PA consumer. In an embodiment, each of the one or more network functions may be identified by one or more nodes and the target node filter is used to select a target node among the one or more nodes. In an embodiment, the target node filter may include a plurality of filter parameters including at least one of a geographical location of the one or more nodes, a virtual resource utilization threshold, a network domain, a node vendor, a traffic type, a slice type and a service type.

In an embodiment, the geographical location of the one or more nodes may specify a geographical location of a node from which the management data is to be collected. In an embodiment, the virtual resource utilization threshold may define a threshold resource utilization percentage of the one or more nodes for collecting the management data. In an embodiment, the network domain parameter may indicate the network domain of the one or more nodes. In an embodiment, the node vendor parameter may indicate name of the vendor of the one or more nodes. In an embodiment, the traffic type parameter may indicate a type of network traffic supported by the one or more nodes. In an embodiment, the slice type parameter may indicate a type of network slice to which the one or more nodes belong. In an embodiment, the service type parameter may indicate a type of service provided by the one or more nodes, the type of service comprising at least one of data, voice, and video.

In an embodiment, the collection time period may specify a start time and an end time for collecting the management data from the one or more nodes.

In an embodiment, the reporting format may indicate at least one of a data streaming format or a data file format.

In an embodiment, wherein the processor is configured to transmit the management data in the data streaming format when the management data is a continuous stream of data, and transmit the management data in the data file format when the management data is a single instance data.

In an embodiment, the data scope may indicate a data standard for collecting the management data, the data standard comprising at least one of a Single-Network Slice Selection Assistance Information (S-NSSAI) or 5G Quality of Service Identifier (5QI).

In an embodiment, the values of the one or more parameters may be collected from the one or more network functions through a PA service producer associated with the one or more network functions. In an embodiment, the one or more network functions may be configured to provide predefined services to one or more entities in the 5G network.

Furthermore, one or more computer-readable storage media may be utilized in implementing embodiments consistent with the disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiments of the Present Disclosure are Illustrated Herein.

In an embodiment, the disclosure provides an abstract Information Object Class (IOC) for collecting management data without knowing the details of the network. This helps even the Performance Assurance (PA) consumers who are not aware of a detailed Network Resource Model (NRM) and/or other attributes of the network to collect management data related to the network.

In an embodiment, the disclosure enables the PA consumers to identify target network functions from which the required management data should be collected, without identifying the attributes of the network functions.

In light of the technical advancements provided by the disclosed method and the Performance Assurance (PA) system, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of disclosure need not include the device itself.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the disclosure are intended to be illustrative, but not limiting, of the scope of the disclosure, which is set forth in the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a performance assurance (PA) producer for collection of management data in a 5th generation (5G) network, the method comprising:

receiving a request from a PA consumer, wherein the request comprising one or more attributes for creating an instance of a management data collection job information object class (IOC);

creating an instance of the management data collection job IOC, based on the one or more attributes;

deriving multiple jobs from a single management data collection job corresponding to the instance of the management data collection job IOC, wherein each of the multiple jobs comprises one or more parameters related to the one or more attributes;

receiving data from multiple sources;

consolidating the data into a single file including the management data for reporting; and transmitting the single file to the PA consumer with a file-based reporting.

2. The method of claim 1, wherein the multiple jobs are mapped, by the PA producer, with one or more network functions for collecting values of each of the one or more parameters.

3. The method of claim 2, wherein the values of the one or more parameters are collected from one or more network functions through a PA service producer associated with the one or more network functions, and wherein the one or more network functions are configured to provide predefined services to one or more entities in the 5G network.

4. The method of claim 1, wherein the one or more attributes comprises at least one of a job type, a target node filter, a collection time period, or a data scope.

5. The method of claim 4, wherein the job type defines a category of the management data requested by the PA consumer, and wherein the target node filter comprises multiple filter parameters including at least one of a geographical location of one or more nodes, a network domain parameter, or a traffic type parameter.

6. The method of claim 5, wherein the geographical location of the one or more nodes specifies a geographical location of a node from which the management data is to be collected, wherein a virtual resource utilization threshold defines a threshold resource utilization percentage of the one or more nodes for collecting the management data, wherein the network domain parameter indicates a network domain of the one or more nodes, wherein a node vendor parameter indicates name of a vendor of the one or more nodes, wherein the traffic type parameter indicates a type of network traffic supported by the one or more nodes, mwherein a slice type parameter indicates a type of network slice to which the one or more nodes belong, and wherein a service type parameter indicates a type of service provided by the one or more nodes, the type of service comprising at least one of data, voice, or video.

7. The method of claim 4, wherein the collection time period specifies a start time and an end time for collecting the management data from one or more nodes.

8. The method of claim 4, wherein a data category of the management data comprises one or more of coverage, energy efficiency, or accessibility.

9. The method of claim 4, wherein the data scope indicates a data standard for collecting the management data, the data standard comprising at least one of a single-network slice selection assistance information (S-NSSAI) or a 5G quality of service identifier (5QI).

10. The method of claim 1, wherein the management data is transmitted in a data streaming format when the management data is a continuous stream of data, and wherein the management data is transmitted in a data file format when the management data is a single instance data.

11. A performance assurance (PA) producer for collecting management data in a 5th generation (5G) network, the PA producer comprising:

a processor; and a memory, communicatively coupled to the processor, wherein the memory stores processor-executable instructions configured to, which, on execution, causes the processor to:

receive a request from a PA consumer, wherein the request comprising one or more attributes for creating an instance of a management data collection job information object class (IOC), create an instance of the management data collection job IOC, based on the one or more attributes, derive multiple jobs from a single management data collection job corresponding to the instance of the management data collection job IOC, wherein each of the multiple jobs comprises one or more parameters related to the one or more attributes, receive data from multiple sources, consolidate the data into a single file including the management data for reporting, and transmit the single file to the PA consumer with a file-based reporting.

12. The PA producer of claim 11, wherein the instructions are configured to cause the processor to map the multiple jobs with one or more network functions for collecting values of each of the one or more parameters.

13. The PA producer of claim 12, wherein the values of each of the one or more parameters are collected from one or more network functions through a PA service producer associated with the one or more network functions, and wherein the one or more network functions are configured to provide predefined services to one or more entities in the 5G network.

14. The PA producer of claim 11, wherein the one or more attributes comprises at least one of a job type, a target node filter, a collection time period, or a data scope.

15. The PA producer of claim 14, wherein the job type defines a category of the management data requested by the PA consumer, and wherein the target node filter comprises multiple filter parameters including at least one of a geographical location of one or more nodes, a network domain parameter, or a traffic type parameter.

16. The PA producer of claim 15, wherein the geographical location of the one or more nodes specifies a geographical location of a node from which the management data is to be collected, wherein a virtual resource utilization threshold defines a threshold resource utilization percentage of the one or more nodes for collecting the management data, wherein the network domain parameter indicates a network domain of the one or more nodes, wherein a node vendor parameter indicates name of a vendor of the one or more nodes, wherein the traffic type parameter indicates a type of network traffic supported by the one or more nodes, wherein a slice type parameter indicates a type of network slice to which the one or more nodes belong, and wherein a service type parameter indicates a type of service provided by the one or more nodes, the type of service comprising at least one of data, voice, or video.

17. The PA producer of claim 14, wherein the collection time period specifies a start time and an end time for collecting the management data from one or more nodes.

18. The PA producer of claim 14, wherein a data category of the management data comprises one or more of coverage, energy efficiency, or accessibility.

19. The PA producer of claim 14, wherein the data scope indicates a data standard for collecting the management data, the data standard comprising at least one of a single-network slice selection assistance information (S-NSSAI) or a 5G quality of service identifier (5QI).

20. The PA producer of claim 11, wherein the processor is further configured to:

transmit the management data in a data streaming format when the management data is a continuous stream of data, and transmit the management data in a data file format when the management data is a single instance data.

* * * * *